Figure 4:
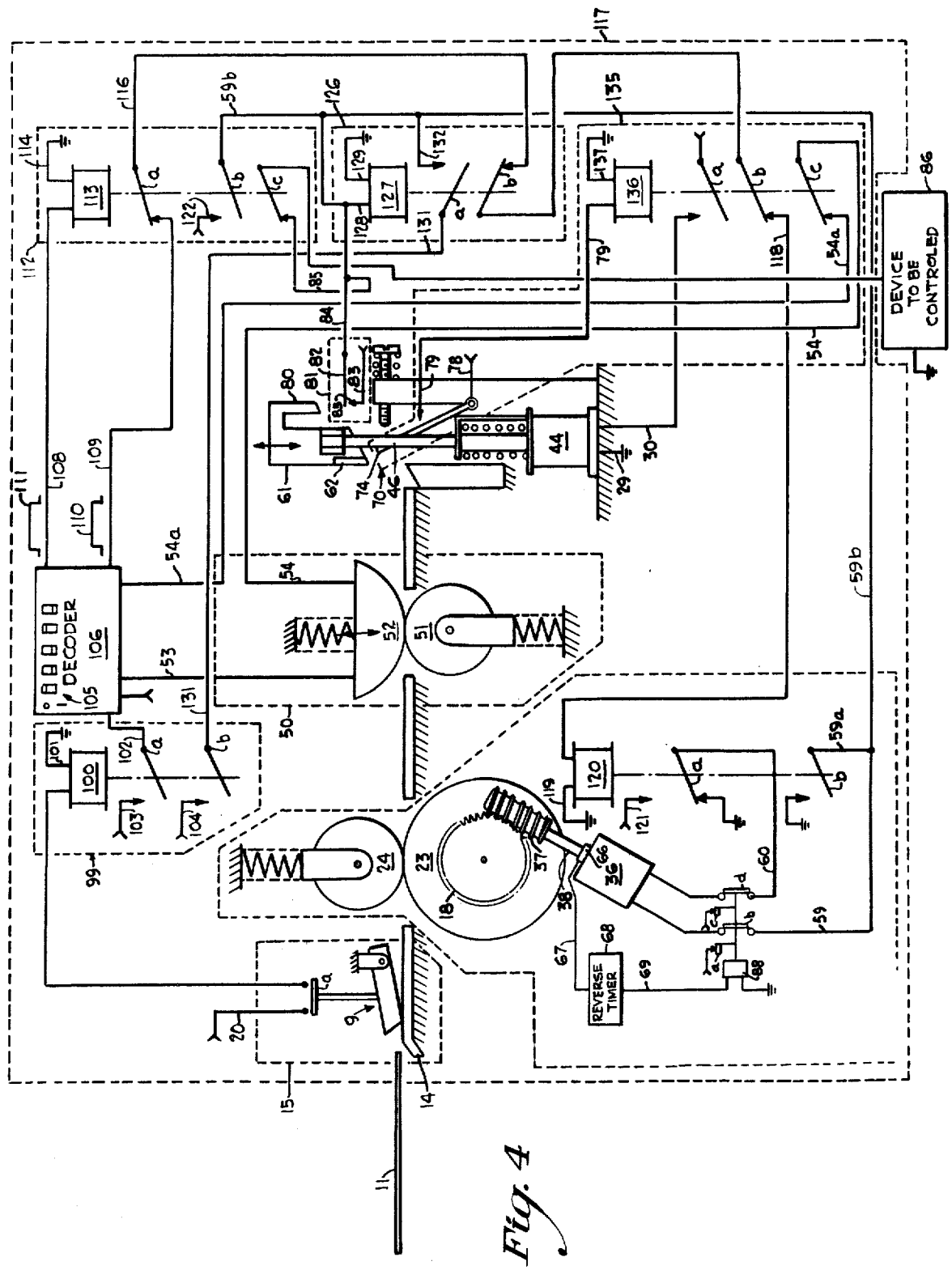

United States Patent [19]

Nama

[11] 4,300,041
[45] Nov. 10, 1981

[54] MAGNETIC CODED CARD ACCEPTOR

[76] Inventor: Donald Nama, 37215 E. Benton Rd., Rancho California, Calif. 92390

[21] Appl. No.: 88,028

[22] Filed: Oct. 25, 1979

[51] Int. Cl.³ .................. G06K 7/08; G06K 13/08; G07F 1/06
[52] U.S. Cl. .................. 235/449; 194/4 R; 235/477; 235/480
[58] Field of Search ............ 194/4 F, 4 R, 4 B; 235/493, 475, 476, 477, 449, 494, 487; 226/11; 234/126; 179/6.4

[56] References Cited

U.S. PATENT DOCUMENTS

| | | | |
|---|---|---|---|
| 3,087,018 | 4/1963 | Pferd | 179/6.4 |
| 3,204,741 | 9/1965 | Maxwell | 194/4 B |
| 3,624,360 | 11/1971 | Collier | 235/477 |
| 3,685,625 | 8/1972 | Loewy | 194/4 R |
| 3,900,715 | 8/1975 | James | 235/487 |
| 3,944,039 | 3/1976 | Houghtaling | 194/4 R |
| 4,145,606 | 3/1979 | Auchinleck | 235/477 |
| 4,196,846 | 4/1980 | Kao | 235/475 |

*Primary Examiner*—Robert M. Kilgore
*Attorney, Agent, or Firm*—Harold A. Williamson

[57] ABSTRACT

This invention relates to a mechanism to read and process a prepaid, flexible, magnetically coded card bearing marked sections adapted be cut off representing value used. Upon insertion into the mechanism a forward/reverse drive means takes control of the card. The card is read and a decoder processes the code signals and signals a "good code" or "bad code" output which activates the forward or reverse drive of the card and associated means, including a card shear which acts upon the card at the decoder relected position, and to return the card.

6 Claims, 5 Drawing Figures

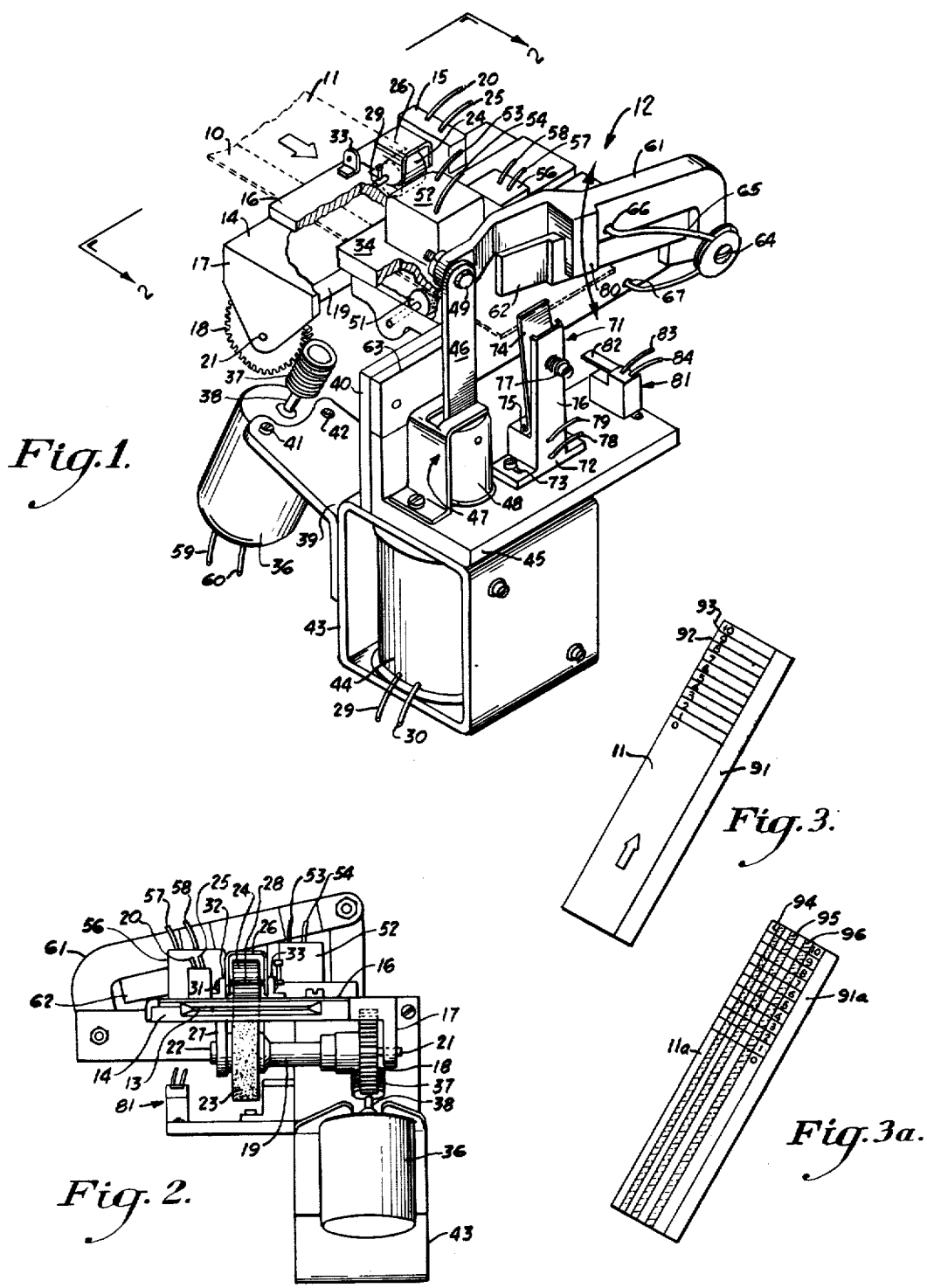

MAGNETIC CODED CARD ACCEPTOR

This invention relates to a magnetic coded card acceptor.

More specifically, this invention relates to a magnetic coded card collector for use in a prepaid fee collection system. The system includes in combination a smooth flexible magnetically coded card which has an end portion which has graphically depicted thereon one or more regions that are to be cut off by the acceptor. The coded card has been prepaid and represents one or more discrete fees to be accounted for by the acceptor. The card is manually inserted into the acceptor where a card presence detector is electrically coupled to a system conditioning means which provides an output indicative of the entry of a card into the system. A card driving mechanism receives the card and includes forward and reverse circuits. The card passes from the card driving mechanism to a code reading mechanism which has electrically connected thereto a decoder. The decoder is also electrically connected to the system conditioning means. The decoder is responsive to a magnetic code detected on the card whenever the system conditioning means provides the aforementioned output. The decoder has a "good code" output and a "bad code" output. A good and bad code control circuit is electrically coupled respectively to the decoder and to a forward drive cancelling and reverse initiating means. The forward drive cancelling and reverse initiating means are electrically coupled to the system condition means. A card travel limit stop and card shear actuating mechanism is electrically connected respectively to the forward drive cancelling and reverse initiating means, the magnetic card code reading mechanism, the card drive means and finally the card shear mechanism. The card travel limit stop and card shear actuating mechanism includes circuitry which allows for the simultaneous interruption of the card drive means and the magnetic card code reading mechanism whenever a card with a good or acceptable code has been delivered to the card travel limit stop.

The system further includes "a prepaid fee collected" and magnetic coded card drive reversing mechanism which is coupled electrically to the good and bad code control circuit, as well as the forward drive cancelling and reverse initiating means. Finally, the prepaid fee collected and magnetic coded card drive reversing mechanism is mechanically coupled to the card shear mechanism and electrically coupled to a device to be controlled by said prepaid fee.

Consumable cards or keys for use in vending machines or in prepaid fare collection schemes has become an increasingly active art as evidenced by the Maxwell et. al. U.S. Pat. No. 3,204,741 and Houghtaling U.S. Pat. No. 3,944,039. The Maxwell et. al. patent involves the use of a rigid card or key as it is termed, with raised ridges along its surface. The rigid key upon insertion into the Maxwell et. al. apparatus has a portion removed thereby.

The Houghtaling patent is directed to a consumable card activated apparatus in which the card has a cross-sectional configuration that allows for a mating driving connection between a pair of gear shaped wheels between which the card travels.

Increasing attention is being focused upon the manner in which revenues from vending machines and transit fare collection systems are received and accounted for. The attention in the vending machine area is directed to the problems that surround current coin operations such as counting, sorting, packing, as well as problems involving the use of slugs and "skimming" by attendants during coin pick up.

In transit fare collection systems there is the constant concern of robbery where the transit vehicle is mobile in nature.

Simply stated, the basic features of the invention involve the use of flexible magnetic cards, which cards bear indication codes that are repeated along the card a number of times equal to the number of purchases the possessor of the card is entitled to make. The card is inserted into the card acceptor system embodying the invention and only if the code is recognized as valid in respect of the use involved i.e. food purchase, laundermats, or fare collection, etc., the card will be drawn into the system where a portion of the card bearing the card will be severed from the card. The card has printed thereon spaced apart consecutive numbers which indicated the number of purchases, operations or trips that are available. As the card is consumed and the card length decreases so also do the visible number of purchases, etc. that remain, decrease.

The magnetic coded card acceptor of the invention to be described more fully hereinafter has the potential for a myriad of uses such as but not limited to any situation where there are coin acceptors, mechanical coin slots, fare collection boxes in transit operation, turnstiles in subways, stadiums, and amusement parks. In gaming devices the uses contemplated are pinball machines and electronic games. In addition public telephones, self-service gasoline station pumps, amusement park rides and door entry system. Yet another application are parking lots where limited ingress and egress is purchased and the magnetic card acceptor system of the invention is used to activate a gate.

The magnetic coded card system of this invention offers unlimited flexibility in pricing, since the price charged for purchase, whether it be fare collection, vending, laundermat or telephone usage, etc., can be regulated by the price of the card. The ability to regulate the price of the card becomes extremely important in areas where pricing is marginal and fluctuates at a rapid pace. The magnetic card system embodying the invention can also be used to control the total dollar sale of certain items, for example, the current gasoline shortages have forced gasoline stations to limit purchases to even dollar amounts. In this type of situation the purchaser would just insert the card into the magnetic card acceptor for the required amount of dollars and the gasoline pump would only dispense that amount.

Not to be ignored is the prepay concept which allows the party selling the cards to have the use of the money involved in the purchase for a period of time before the goods or services are used In transit fare systems the invention also contemplates the inclusion of additional codes on the card to allow for the counting by the magnetic card acceptor system of such types of fare as regular fare, senior citizen fare, handicap fare and student fare. This type of information is frequently required by the Federal Government where Federal dollars are involved in the transit operation.

Although, not a part of the invention to be described hereinafter, the magnetic code cards can be acquired through dispensers at many locations which further enhance the system's utility.

It is therefore a primary object of the invention to provide an improved consumably magnetically coded card acceptor system that may be employed to activate any one of the plurality of different devices.

In the attainment of the foregoing object, the invention as noted earlier employs the use of a smooth flexible magnetically coded card which has one or more regions that will be severed or consumed along with the coded information by the card acceptor system of this invention.

When the magnetic coded card is inserted into the acceptor a card presence detector which is electrically connected to a system conditioning means provides an output indicative of the entry of the card into the system. The end of the card to be severed is manually delivered past the card presence detector to a card drive means which has forward and reverse circuits. A magnetic code reading mechanism is adjustably positioned adjacent the path of the card to read the code thereon. A decoder is electrically coupled respectively to the magnetic code reading mechanism and the system conditioning means. In the preferred embodiment the decoder is manually resetable to a plurality of different code patterns. The decoder is responsive to a magnetic code detected when the system conditioning means provides the aforementioned output. The decoder has two outputs one of which is indicative of a good code detected and the other indicative of a bad or unacceptable code. A circuit designated as a good and bad code control circuit is electrically coupled respectively to the decoder and to a forward drive cancelling and reverse intitiating circuit. The forward drive cancelling and reverse initiation means are electricaly coupled to the system condition means. The good and bad code control circuit operates upon detection of a good code to allow the passage of a control signal to thereby allow the card drive means to feed the card into the acceptor system and to reject a card when a card with an improper code is entered into the system. This rejection is accomplished by the simultaneous interruption of power to the card drive means and the disconnection of a device to be controlled as well as the provision of a reverse control signal to the card drive means.

After the card is delivered past the magnetic code reading mechanism it is delivered to a card travel limit stop and card shear actuating mechanism. The card travel limit stop and card shear actuating mechanism is electrically connected respectively to the forward drive cancelling and reverse intitating means, the magnetic card code reading mechanism and finally to the card drive means and card shear mechanism.

The card travel limit stop and card shear actuating mechanism include means to simultaneously interrupt the operation of the card drive means and the magnetic card code reading mechanism. The card shear actuating mechanism includes a biased open pivoted cutting member which cooperates with a fixed cutting member to shear off a preselected length of the card when the card has been delivered to the card travel limit stop and shear activating mechanism.

A prepaid fee collected and magnetic coded card drive reversing mechanism is electrically coupled respectively to the good and bad code control circuit and the forward cancelling and reverse initiating means. The prepaid fee collected and magnetic coded card drive reversing mechanism are operatively coupled to the card shear actuating mechanism and electrically coupled to the device to be controlled by employment of the magnetically coded card which represents the prepaid fee. A reverse torque sensor included in the drive means detects the attempted removal of a card prematurely and reverses the drive means to eject the card.

The invention contemplates in another embodiment the use of a magnetically coded card that further has imprinted thereon a plurality of differing codes, spaced apart along its length. The use of this card with additional codes requires that the card acceptor system have in combination a second code detector positioned in close proximity to the card during its travel through the system. This second code detector will provide an indication of the coded information of the plurality of spaced apart differing codes on the card.

The invention also contemplates that the magnetic code reading mechanism can be manually adjusted in the field to thereby allow the card acceptor to be adjusted to take only a new and different coded card.

Other objects and advantages of the present invention will become apparent from the ensuing description and illustrative embodimets thereof, the course of which reference is made to the accompanying drawings in which:

FIG. 1 is a three dimensional of the electromechanical portion of the magnetic card acceptor of the system of the invention, and FIG. 2 is end view of FIG. 1 taken along the line 2—2 of FIG. 1, and FIG. 3 illustrates a magnetic coded card for use in the system embodying the invention, and FIG. 3a depicts another embodiment of a magnetic coded card with additional coded information thereon, and FIG. 4 sets forth a schematic of the system that represents a preferred embodiment of the invention.

Reference is now made to FIG. 1 and FIG. 2 which sets forth in a three dimensional form the electromechanical portion of the magnetic coded card acceptor system. FIG. 1 and FIG. 2 should be studied in conjunction with each other as the following description ensues.

Shown in dotted out at the top of the figure and to the rear of the magnetic coded card acceptor 12 is a smooth flexible magnetically coded card 11 with a magnetic code 10 imprinted thereon. The nature of code will be set forth in greater detail hereinafter. The magnetic coded card 11 is shown inserted in a slot 13, FIG. 2. The slot 13 is formed between a card support plate 14 and a card cover plate 16. The card support plate 14 has at its end nearest the viewer a downwardly depending flange 17 which has a shaft end bearing 21 of a shaft 19 which shaft 19 carries at one end a gear 18 and at the other end a rubber card driving wheel 23. Shaft 19 at the end adjacent the rubber drive wheel 23, has on a shaft bearing 22 in a downwardly dependent flange 27 which flange 27 is integral with the card support plate 14. The gear 18 is shown drivingly connected to a worm gear 37 which is secured to a motor drive shaft 38 of a reversible motor 36. The reversible motor 39 with its leads 59, 60 is secured to a motor support flange 39 by screws 41, 42.

The card cover plate 16 has a card presence detector 15 secured thereto by means not shown. The card presence detector in one form can be a simple microswitch with a contact member projecting into the path of the card 11 during card insertion. The card presence detector 15 has a pair of leads 20, 25 which are part of the electrical system to be described hereinafter.

The card cover plate 16 also has integral therewith a pair of shaft support flanges 32, 33 which carry an idler wheel housing support shaft 28. An idler wheel housing 26 carries an idler wheel 24 on a shaft 29. The idler wheel 24 and its housing 26 are spring biased in a manner not shown so as to cause the idler wheel 24 to press against the rubber card driving wheel 24. When a card 11 is fed into slot 13 and the rubber card driving wheel 23 has been activated in a manner to be described later, the card 11 is punched between the idler wheel 24 and the rubber card driving wheel 24 and the card 11 is thereafter drawing into the acceptor 12 for further processing and later returned to a user of the system. The reversible motor 36 through its drive train of shaft 38, worm gear 37, gear 18, shaft 19 ad rubber card driving wheel 23 cause the card to move in and out of the acceptor 12.

A relay support housing 43 carries the motor support flange 39 by fasteners not shown. Integrally secured to the relay support housing 43 is vertical support plate 40 which carries at its upper end a fixed cutting member 63 the function of which will be covered later.

The card support plate 14 is secured to the vertical support plate 40. The details of this physical connection of the card support plate 14 and vertical support plate 40 cannot be readily discerned in this illustration because of the many details already depicted. Suffice it to say the manner of this physical connection is not significant to the invention.

The card support plate 14 also carries a code detector cover plate 34 which cover plate supports a magnetic code reading head 52 shown with a pair of leads 53, 54. The magnetic code reading head and its operation will be explained more fully hereinafter.

The code detector cover plate 34 has a region shown broken away to reveal the presence of idler wheel 51 which is spring biased in a manner not shown but in a fashion that causes a card 11 passing over the idler wheel 51 to be pressed toward the magnetic code reading head 52.

A second code detector 56 with leads 57, 58 is also shown. This second code detector is optional and may or may not be included in the preferred embodiment. The function of the second code detector will be set forth in connection with the description of FIG. 3a.

The relay support housing 43 noted earlier has secured within as shown a relay 44 with leads 29, 30. The relay 44 has an armature 46 which extends upwardly through a sleeve 48 (with a spring inside not shown) and a fiburcated opening in armature travel stop 47. The upper end of the armature 46 has pivot bolt 49 which passes through the armature 46 and secures it to one end of a shear arm 61. The other end of the shear arm 61 is shown pivotally connected to vertical support plate 40 and fixed cutting member 63 by a pivot bolt and washer arrangement 64. A spring 65 wound around the pivot bolt 64 has one end 66 secured in an opening (not referenced) in the shear arm 61 and the other end 67 secured in an opening (not referenced) in the fixed cutting member 63.

The spring 65 as well as the unshown spring in sleeve 48 combine to keep the shear arm 61 in an upward position until the relay 44 has been actuated to draw the shear arm 61 downward. The shear arm 61 has secured thereto what is termed a moving cutting member 62 which cooperates with fixed cutting member 63 to shear off a precise portion of the card 11 here shown in phantom outline beneath and between moving cutting member 61 and fixed member 63.

The support plate 45 previously noted carries thereon two units, the first of which is termed a card travel limit stop switch 71 and the second a fee collected switch 81.

The card travel limit stop switch 71 with leads 78, 79 has a switch base 72 that includes an adjustment slot 73. A moable contact 74 is secured by a pivotal connection 75 to a fixed contact support member 76. The fixed contact support member 76 includes an adjustment screw 77. The adjustment screw 77 and adjustment slot 73 cooperate to provide the card acceptor 12 with the ability of cutting different lengths of the card 11.

The shear arm 61 has a protuberance 80 which cooperates with a movable contact 82 of the fee collected switch 81 whenever the relay 44 has been activated. The fee collected switch 81 has a pair of leads 83, 84.

Reference is now made to FIG. 3 and FIG. 3a which respectively illustrate the smooth flexible magnetically code cards 11, 11a. The magnetically coded card 11 of FIG. 3 is of the type employed in conjunction with the acceptor 12 of FIG. 1 and has a continuously magnetically coded strip 91 along one edge thereof. Any of a multitude of magnetic codes may be electrically recorded on this magnetic strip. The code selected for a given card will be chosen to match a particular use. The card so encoded would be initially accepted by any card acceptor but rejected in the manner set forth in detail hereinafter should the card not have a code that matched the magnetic code reading mechanism of the acceptor.

Each of the cards 11 would have imprinted thereon numbered fare or fee portions 92, 93 which are cut off by the acceptor. Each time the card is used, the card user may visually ascertain how many card usages he has left as the fare or fee portions are numbered as shown. The card 11 of FIG. 3 is shown with ten (10) prepaid fares or fees.

FIG. 3a depicts another form of the magnetically coded card 11a which has in addition to the magnetically coded strip 91a a plurality of spaced apart code strips 94, 95, 96. The presence of these code strips 94, 95, 96 will allow the addition of a second code reading detector 52 (FIG. 1) that will provide an output indicative of the presence of any of the coded strips 94, 95, 96 or any combination thereof. This feature allows the user of the system to determine rate of use of the system by different classes of users such as students, elderly, etc. Each class of user would have their own code. The coded strips can either be colored or magnetic and the code detector employed would recognize the color codes or magnetic codes as the case might be.

Reference is now made to FIG. 4 which sets forth in schematic form an embodiment of the system that will perform all essential functions recognized as critical to system operation.

At the outset it should be understood that the system of FIG. 4 is shown in the most elementary form and that many features of the system could be constructed of solid state components. Accordingly, it will be seen upon study of FIG. 4 that there are a number of system components that have been outlined in a broken line or dash-dash fashion. Each of these system components or means as they will be termed hereinafter may have in practicing the invention their solid state equivalent substituted therefore.

In FIG. 4 wherever reference numerals of preceeding figures refer to the same element they will be employed to enhance the readers understanding of the invention.

The description that follows will combine system operation with structure and circuit descriptions.

Turning now to the details of FIG. 4, a smooth flexible magnetic coded card 11 is shown partially inserted into the acceptor 12, shown in the enclosed outline, and entering the card presence detector 15 where the card 11 manually is pushed against the pivoted switch arrangement 9 which closes contact a thereof to complete a circuit from a battery source over lead 20, contact 9a, lead 25 to and through a relay 100, and lead 101 to ground of the system conditioning means 99. This just completed circuit will energize relay 100 closing relay 100 contact a and b thereby completing the following circuit to the decoder 106, via lead 105, contact 100a and lead 102.

The decoder 106 may be of the resettable type where a plurality of different acceptable codes may be readily affected by merely flipping the several switches designated by arrow 105 into any combination of "0" or "1" positions. In practicing the invention the decoder 106 is located in the system near an opening in the card acceptor outer housing (not shown). In this position the decoder may be manually adjusted in the field to thereby allow the card acceptor to be adjusted to take only a new or different coded card.

As noted earlier, the decoder 106 is now in a condition state ready to receive a code signal from the magnetic code reading mechanism 50. Additionally, the decoder 106 will provide a signal 110 on lead 109 which signal will be delivered to the card drive means 35 via lead 109, back relay contact 113a, lead 116, back relay contact 127b, lead 117, back relay contact 136b, lead 118, relay 120, lead 119 to ground. This circuit just described will energize relay 120 of the card drive means 35 completing a circuit from a battery source, lead 121, front relay contact 120a, lead 60, relay 88 contact d, reversible motor 36, relay 88 contact b, lead 59, 59a, front relay contact 120b to ground. The reversible motor 36 will be activated and the rubber drive wheel 23 will be driven through shaft 38, worm gear 37 and gear 18. The card 11 will be drivingly gripped by the rubber wheel 23 and spring biased idler wheel 24, and delivered to the magnetic code reading mechanism 50.

It should be noted here that the reversible motor 36 has on its output shaft 37 a reverse torque switch 66 that will be activated should someone attempt to pull the card 11 back out of the card acceptor 12 before the entire operating being described is accomplished. The reverse torque switch 66 is connected by lead 67 to a reverse timer 68. The reverse timer 68 is designed to provide an output on lead 69 for a period of time sufficient to allow the card to be ejected in the manner now described. The lead 69 is connected to reverse drive relay 88 which has contacts a, b, c and d as shown. Relay 88 contacts b and d are normally closed. When the relay 88 is energized the normally closed contacts b and d are opened and contacts a and c are made. Contact a is connected to a battery source shown and contact c is connected to ground. It will be seen that this arrangement just described will allow the motor 36 to experience when relay 88 is activated a reverse in polarity and the rubber card driving wheel will reverse its direction and eject the card 11.

The passage of the card 11 between magnetic code pickup head 52 and the second spring biased idler wheel 51 will result in a signal appearing on leads 53 and 54 which leads are connected to the decoder 106. The presence of a good or acceptable code detected on the card 11 by the decoder 106 will allow the signal 110 to remain on lead 109 of the decoder 106 thereby allowing the reversible motor 36 of the card drive means 35 to continue its operation and the delivery of the card 11 to the card travel limit stop and card shear actuating mechanism 70.

In the event that the code detected is not acceptable or is a bad code as it may be termed, then the decoder 106 will have an output signal 111 appear on lead 108 and the signal 110 will disappear. The disappearance of the signal 110 on lead 109 will cause drive relay 120 to become deenergized and this will interrupt the operation of the drive motor 36.

The presence of signal 111 on lead 108 will energize good and bad code control relay 113, which relay 113 is connected to ground by lead 114.

The effect on system operation which results from the energization of good and bad code control relay 113 will now be set forth.

With the relay 113 in a picked-up condition, its back relay contact 113a is opened which further insures the interruption of a circuit path to the drive motor relay 120, and simultaneously completes a circuit path to and through the reversible motor 36 in the opposite direction to cause reversal of the motor 36 drive direction. This reversal of motor drive direction will cause the card 11 to be ejected. The circuit that accomplishes this reversal is as follows beginning with battery terminal and lead 122, front control relay contact 113a, lead 59b, lead 59, relay 88 contact b, motor 36, relay 88 contact d, lead 60, back drive motor relay contact 120a to ground.

Assuming that a good or acceptable code has been detected on card 11, the card drive means 35 will advance the card 11 until it strikes moveable contact 74 of the card travel limit stop and card shear actuating mechanism 70. Moveable contact 74 then competes a circuit to and through relay 136 from a battery terminal, lead 78, moveable contact 74, lead 79, lead 137 and thence to ground. This results in the actuation of relay 136 which interrupts two circuits and completes a third.

The first circuit to be described that is interrupted includes the decoder 106, lead 109, back contact 113a of relay 113 lead, back contact 127b of relay 127, lead 117, and now opened back contact 136b of relay 136, and lead 119 to relay 120. The opening of back contact 136b of relay 136 insures that the reversible motor 36 is stopped.

The second circuit to be interrupted insures that the decoder 106 does not receive an input after the card 11 has reached the end of its travel, and the card shear step to be described hereinafter is performed.

With back contact 136c of relay 136 open due to the energization of relay 136 just described, the circuit between the magnetic code reading head 52 which includes lead 54, back contact 136c of relay 136 and lead 54a is interrupted.

The circuit of the card travel limit stop and card shear actuating mechanism 70 that is completed by the actuation of relay 136 includes a battery terminal front contact 136a of relay 136, lead 30, relay 44 and lead 29 to ground. The actuation of relay 44 causes the armature 46 connnected to shear arm 61 with moving cutting member 62 to be pulled downward to shear a portion of the card 11 not illustrated when the moving cutting member 62 cooperates with fixed cutting member 63.

The movement downward of shear arm 61 causes protuberance 80 to strike the moveable contact 82 of switch 81 and force contact 82 into an electrical connection with a fixed contact 85, which results in the actuation of relay 127 which in turn, causes the reversible motor 36 to reverse direction and eject the card with a fare or fee portion removed. Simultaneously, the device 86 which is to be controlled, is actuated. The card ejection after fee collection is accomplished by the completion of the following circuit; namely, a battery terminal and lead 83 fixed electrical contact 85, moveable contact 82, lead 84, lead 128, relay 127 and lead 129 to ground. The actuation of relay 127 by the circuit just described completes a circuit to the motor 36 via the following circuit path; namely, a battery terminal and lead 104 front and contact 100b of relay 100, lead 131, front contact 127a of relay 127, lead 132, lead 59b, lead 59, relay 88 contact d, motor 36, relay 88 contact b, lead 60, back contact 120a of relay 120 to ground.

From the foregoing description, it is apparent that the invention embodied in the system allows for the dynamic and efficient operation of a mangetic card acceptor for use in a prepaid fee collection system.

Although this invention has been illustrated and described in connection with particular embodiments thereof, it will e apparent to those skilled in the art that various changes such as conversion to solid state electronic equivalents and similar modifications may be made therein without departing from the spirit of the invention.

What is claimed as new:

1. A magnetic coded card acceptor for use in a prepaid fee collection system, said system including in combination a smooth flexible magnetic coded card having a continuous magnetic code along its entire length, and a card presence detector electrically coupled to a system conditioning means to provide an output indicative of the entry of a card into said system, a card drive means having forward and reverse circuits, at least one decoder electrically coupled respectively to a magnetic card code reading mechanism and said system conditioning means; said decoder responsive to a magnetic code detected when said system conditioning means provides said output, said decoder having at least a good code output and a bad code output, a good and bad code control circuit electrically coupled respectively to said decoder and to a forward drive canceling and reverse initiating means; said forward drive canceling and reverse initiating means are electrically coupled to said system conditioning means, a card travel limit stop and card shear actuating mechanism electrically connected respectively to said forward drive canceling and reverse initiating means; said magnetic card code reading mechanism and said card drive means and a card shear mechanism; said card travel limit stop and card shear actuating mechanism including means to simultaneously interrupt the operation of said card drive means and said magnetic card code reading mechanism, a prepaid fee collected and magnetic coded card drive reversing mechanism electrically coupled respectively to said good and bad code control circuit and said forward drive canceling and reverse initiating means, said prepaid fee collected and magnetic coded card drive reversing mechanism operatively coupled to said card shear actuating mechanism and electrically coupled to a device to be controlled by said prepaid fee.

2. The magnetic coded card acceptor system of claim 1 wherein said smooth magnetic coded card has imprinted thereon, a plurality of differing codes spaced apart along its length.

3. The magnetic coded card acceptor system of claim 2 wheren said good and bad code control circuit operates upon detection of a good code to allow the passage of a control signal to thereby allow said card drive means to feed said card into said system and to reject a card when a card with improper code is entered into said system; this rejection is accomplished by the simultaneous interruption of power to said card drive means and disconnection of said device to be controlled from said system as well as the provision of a reverse control signal to said card drive means.

4. The magnetic coded card acceptor system of claim 3 wheren said card shear actuating mechanism includes a biased open pivoted cutting member which cooperates with a fixed cutting member to shear off a preselected length of said card when said card has been delivered to said card travel limit stop and shear actuating mechanism.

5. The magnetic coded card acceptor system of claim 4 wherein said decoder is manually resettable to a plurality of different code reading patterns.

6. The magnetic coded card acceptor system of claim 1 wherein said system includes in combination a second code detector and decoder positioned in close proximity to said card during said cards movement through said system to detect and provide an indication of the coded information of said plurality of spaced-apart differing codes on said card.

* * * * *